(No Model.)
A. J. FINLAY & C. WILSON.
STEAM COOKER.
No. 565,340.         Patented Aug. 4, 1896.
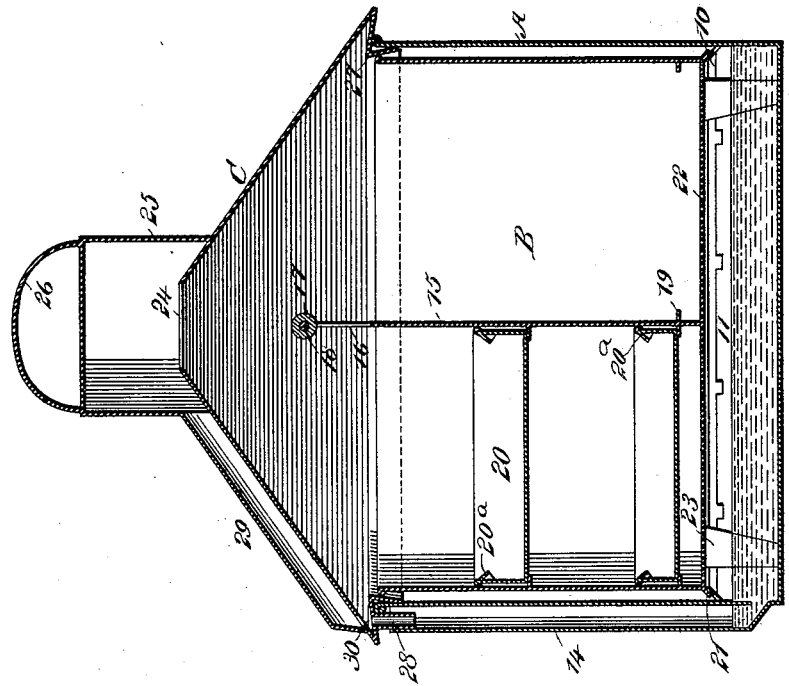
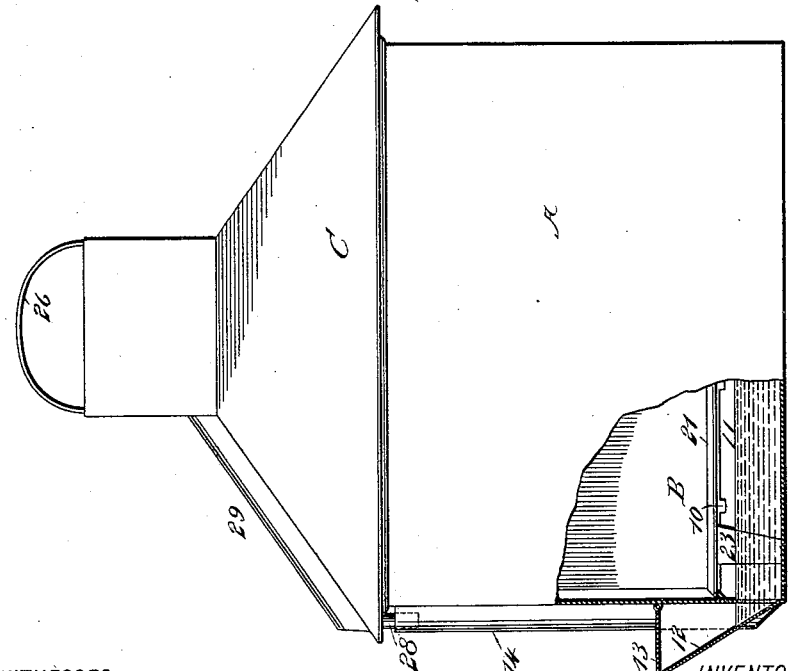
WITNESSES:
Edward Thorpe
J. Fred. Acker
INVENTORS
A. J. Finlay
C. Wilson
BY Munn & Co.
ATTORNEYS.

UNITED STATES PATENT OFFICE.

ALBERT J. FINLAY AND CHARLES WILSON, OF SILVERTON, OREGON.

STEAM-COOKER.

SPECIFICATION forming part of Letters Patent No. 565,340, dated August 4, 1896.

February 19, 1895. Renewed December 26, 1895. Serial No. 573,398. (No model.)

*To all whom it may concern:*

Be it known that we, ALBERT J. FINLAY and CHARLES WILSON, of Silverton, in the county of Marion and State of Oregon, have invented a new and useful Improvement in Steam-Cookers, of which the following is a full, clear, and exact description.

Our invention relates to an improvement in steam-cookers; and it has for its object to provide a cooker in which the tray may be removed from the body of the receptacle without danger of burning the hands, and whereby when the tray is set upon a support the air may circulate beneath it, preventing any odor from any material near by being passed through the material in the tray.

Another object of the invention is to so construct the steam-cooker that when the tray is within the body of the receptacle the steam will be compelled to pass slowly up through the tray, being effectually prevented from passing around it, and whereby, furthermore, the steam will be comparatively dry when entering the tray.

Another object of the invention is to construct a cooker in a simple, durable, and economic manner and provide for the return of the products of combustion to the water-receptacle in the bottom of the cooker.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a side elevation of the cooker, a portion of one corner of the casing being broken away; and Fig. 2 is a vertical section through the entire cooker.

In carrying out the invention the steam-cooker comprises a body vessel A, a tray B, adapted to be placed within the body vessel, and a cover C. The body vessel may be of any desired shape. Preferably, as shown in the drawings, it is made substantially rectangular, and within the body vessel A, a predetermined distance from the bottom, an upwardly-extending flange 10 is formed upon the inner surface, extending entirely around the receptacle, and the space beneath this flange comprising a water-receiving compartment 11.

Upon the exterior of the body-receptacle at one side a lip 12 is formed, covered by a lid 13, and the said lip extends down into the bottom portion of the water-receiving chamber 11, as shown in Fig. 1. Thus by lifting the lid 13 from the lip the depth of water in the said water-receiving chamber may be determined without removing the cover from the cooker, and preferably upon the same side of the body-receptacle a return-pipe 14 is exteriorly secured, having communication likewise with the said water-receiving chamber or compartment 11, as shown in Figs. 1 and 2. This return-pipe 14 extends upward nearly to the top of the vessel.

The tray B is divided into any number of compartments desirable by means of partitions 15. The central partition, however, is carried upward above the plane of the top of the tray proper, and at its center has a recess 16 made therein, across which a handle 17 is placed, the said handle being preferably of wood, the binding or marginal wire 18 of the partition passing through the said handle. Thus the tray may be removed from the body-receptacle without danger of burning the hands.

The compartments are preferably provided with ledges 19, upon which pans 20 may be made to rest, adapted to contain vegetables, meats, or any desired material, each pan having a handle $20^a$ upon the inner face of each end.

The tray is provided with a lower marginal flange 21, which extends downwardly and outwardly therefrom, and when the tray is placed in the body-receptacle its flange 21 will rest upon and conform to the flange 10 of the said body and the steam will be effectually prevented from escaping up between the sides of the tray and those of the body-receptacle.

The body of the tray has a number of very small apertures 22 made therein, in order that as the water in the body-receptacle becomes heated and generates steam, the steam is kept within the chamber 11 until it is comparatively dry before it can escape up into the compartments of the tray, and it is obvious that these compartments will receive all of the steam generated. The tray is further provided with legs 23 at each of its corners, whereby when the tray is removed from the body-receptacle and placed upon a kitchen table which has been used for dressing vegetables having obnoxious odors the said odors will not be drawn up into the tray by reason of the circulation of air occurring between the table and the tray. The cover C is made to taper upwardly, and has an opening 24 in its top surrounded by a dome 25, which is provided with a handle 26 in order that the cover may be readily removed or placed in position. The cover has an angular marginal flange 27, one member whereof extends inward in a substantially horizontal direction, the other member extending downwardly and outwardly, so that when the cover is placed in position on the body-receptacle the horizontal member of the flange will engage with and rest upon the top of the body-receptacle, while its vertical member will extend within the receptacle and engage therewith, as shown in Fig. 2. This flange 27 may be termed a "drip-flange," since its horizontal member forms substantially a gutter, and when condensation takes place upon the inner face of the cover the waters of condensation will be caught by the aforesaid gutter and be conducted to a drip-pipe 28, which extends upward through the horizontal or gutter member of the flange, and when the cover is in place enters the return-pipe 14.

The dome 25 has an opening in the bottom portion of one side around which one end of a drip-pipe 29 is secured. This pipe extends downward along the outer face of the cover to a point over the flanged drip-pipe 28, and the water of condensation occurring in the dome will find its way down the drip-pipe 29 into the gutter drip-pipe 28 through an opening 30 in the said cover, as is likewise shown in Fig. 2.

The said steam-cooker is exceedingly simple, durable, and economic in its construction, as has been heretofore stated, and may be used wherever any steam-cooker can be employed.

Having thus described our invention, we claim as new and desire to secure by Letters Patent—

1. In a steam-cooker, the combination with a vessel having a water-receiving compartment at its bottom and a return-pipe leading into the water-receiving compartment, of a tapering cover having a gutter-like flange at its bottom a drip-pipe extending from said flange and adapted to enter the return-pipe of the said vessel, a dome located over an opening in the top of the cover and a drip-pipe communicating with the dome and extending along the cover to an opening therein over the gutter drip-pipe, as and for the purpose set forth.

2. In a steam-cooker, a tray having a finely-perforated bottom, and one of its partitions extending upward above the top of the tray, recessed and provided with a handle extending across the recess, and legs secured upon the bottom of the tray, as and for the purpose specified.

ALBERT J. FINLAY.
CHARLES WILSON.

Witnesses:
MATTIE WILSON,
G. W. DOLAN.